J. BEEHLER.
Reversing-Valves for Steam-Engines.

No. 150,671. Patented May 12, 1874.

Witnesses:
D. R. Cowl
Will. H. Morrow

Inventor.
Jacob Beehler
per A. H. & R. K. Evans
attys.

UNITED STATES PATENT OFFICE.

JACOB BEEHLER, OF CHICAGO, ILLINOIS.

IMPROVEMENT IN REVERSING-VALVES FOR STEAM-ENGINES.

Specification forming part of Letters Patent No. 150,671, dated May 12, 1874; application filed April 8, 1874.

*To all whom it may concern:*

Be it known that I, JACOB BEEHLER, of Chicago, Illinois, have invented a new and useful improvement in Reversing-Valves for Steam-Engines, of which the following is a full, clear, and exact description, reference being had to the accompanying drawings making a part of this specification, in which—

Figure 1:
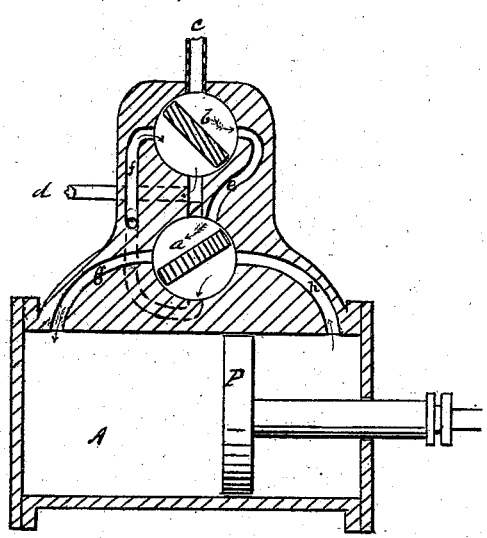
Figure 2:
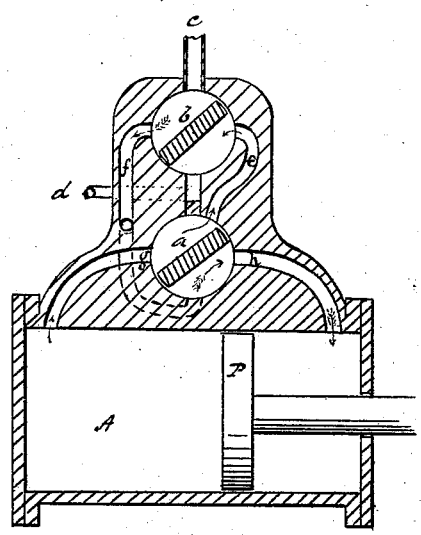

Figures 1 and 2 are vertical sections, showing my improvement.

To enable others skilled in the art to make and use my invention, I will proceed to describe the exact manner in which I have carried it out.

My improvement relates to the use of valve-cocks, of suitable form, which may be used or operated to reverse the direction of the steam passing to or from the valve-chest of a steam-engine; and consists in the combination of the several devices hereinafter described.

In the drawings, A represents a steam-chest, and P the piston. Above the steam-chest, and above each other, are placed the valves $a\ b$, and above these the pipe $c$, for the introduction of steam from the boiler. The exhaust-pipe $d$ is placed between the valves $a\ b$.

The operation of my reversing-valves is as follows: The live steam from the boiler will be received through the pipe $c$, and will be passed, as shown in Fig. 1, first to the right, through the valve $b$, and then to the left, through the valve $a$, into the steam-chest, as shown by the feathered arrows. By reversing the position of the valve $b$, as shown in Fig. 2, the whole action of the steam will be reversed, as therein shown, the live steam passing first to the left, through the valve $b$, thence to the right, through the valve $a$, into the opposite end of the steam-chest. The exhaust is also reversed, as shown by the plain arrows. The valve $a$ is moved by an eccentric in the usual way, but the valve $b$ is in the hand of the engineer, and moved with very little power, and will retain its position at all times when not used by the engineer for the purpose of reversing the motion of his engine.

Having thus explained my invention, what I claim as new, and desire to secure by Letters Patent, is—

In combination with the chest of a steam-engine, the valves $a$ and $b$, arranged with the pipes $e\ f\ g\ h$, constructed and operating substantially and for the purpose set forth.

JACOB BEEHLER.

Witnesses:
FR. W. WOLF,
W. L. LEHLE.